(12) United States Patent
Schreib

(10) Patent No.: US 6,353,630 B1
(45) Date of Patent: Mar. 5, 2002

(54) METHOD FOR THE PARAMETERIZATION OF A RECEPTION MEANS AS WELL AS A CORRESPONDING RECEPTION MEANS AND RADIO STATION

(75) Inventor: Franz Schreib, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 08/833,184

(22) Filed: Apr. 4, 1997

(30) Foreign Application Priority Data

Apr. 4, 1996 (DE) .......................................... 196 13 624

(51) Int. Cl.[7] ................................................ H03H 7/30
(52) U.S. Cl. ........................ 375/229; 375/231; 375/232; 375/341; 375/347
(58) Field of Search ................................ 375/229, 231, 375/232, 233, 341, 348, 347; 329/316, 318, 327; 370/337, 522

(56) References Cited

U.S. PATENT DOCUMENTS

| | | | | |
|---|---|---|---|---|
| 5,228,058 A | * | 7/1993 | Ushirokawa et al. | 375/14 |
| 5,231,648 A | | 7/1993 | Driedger et al. | 375/231 |
| 5,285,474 A | * | 2/1994 | Chow et al. | 375/13 |
| 5,533,067 A | * | 7/1996 | Jamal et al. | 375/341 |
| 5,661,753 A | * | 8/1997 | Itemura | 375/322 |
| 5,694,424 A | * | 12/1997 | Ariyavisitakul | 375/233 |

FOREIGN PATENT DOCUMENTS

DE    41 08 806 C1    1/1992

OTHER PUBLICATIONS

W. Koch, "Optimum and sub–Optimum Detection of Coded Data Disturbed By Time–Varying Intersymbol Interference", IEEE Proceedings 1990, pp. 1679–1684.

M. Mouly et al, "The GSM System For Mobile Communications", 49, rue Louise Bruneau, F–91120 Palaiseau, Frankreich, 1992, pp. 231–237.

Proakis, "Digital Communications", Digital Signaling Over a Bandwidth–Constrained Linear Filter Channel, pp. 593–595.

* cited by examiner

*Primary Examiner*—Stephen Chin
*Assistant Examiner*—Shuwang Liu
(74) *Attorney, Agent, or Firm*—Schiff Hardin & Waite

(57) ABSTRACT

The method is for the parameterization of at least one reception apparatus for a radio station, whereby the reception apparatus contains an adaptive pre-filter. The filter coefficients of the pre-filter for suppression of received noise quantities and the channel coefficients for the detector for compensating the transit time differences of different signal components of a reception signal are simultaneously determined. During a training sequence, test data present in the reception apparatus is evaluated with channel coefficients in a channel model, and received test data is evaluated with filter coefficients of the pre-filter and superposed to form antenna data or, respectively, model quantities. The minimization of the deviation of antenna data and model quantities is undertaken upon exclusion of the trivial solution. The method is especially suited for base stations and mobile parts in mobile radiotelephone systems.

16 Claims, 3 Drawing Sheets

METHOD FOR THE PARAMETERIZATION OF A RECEPTION MEANS AS WELL AS A CORRESPONDING RECEPTION MEANS AND RADIO STATION

BACKGROUND OF THE INVENTION

The invention is directed to a method for the parameterization of a reception means of a radio system with allocated antenna means and with a pre-filter and to such a reception means or, respectively, a radio station with at least one reception means.

In a radio system, information is transmitted from a transmitting radio station to a receiving radio station. This information arrives at the receiving radio station in the form of reception signals. Due to various external influences, the reception signals reach the receiving radio station over a plurality of transmission paths. The signal components corresponding to the various transmission paths arrive at the receiving radio station at successive points in time. There is then the problem in the receiving radio station of equalizing these signal components, which can also be influences by further noise components, of correcting the errors and decoding the transmitted information.

Proakis,"Digital Communications", 1989, pp.593–595 discloses pre-filters that suppress noise components in the reception signals, particularly adjacent channel interference, in a reception means before the detection. A pre-filer is composed of delay elements in which the reception signals are delayed in steps. The reception signals with different delay are respectively weighted with a filter coefficient and are subsequently summed up. The filter coefficients, however, are permanently prescribed, and the pre-filter is part of an equalizer, whereby the detector is fashioned as a simple threshold decision unit.

Further parameters are defined within the reception means for the evaluation of the reception signals. For example, these parameters are channel coefficients known from W. Koch,"Optimum and sub-optimum detection of coded data disturbed by time-varying intersymbol interference", IEEE Proceedings 1990, pp. 1679–84. These channel coefficients used in a channel model serve the purpose of suitably superposing various signal components of a reception signal that arrive after one another.

It is also known to supply the antenna data acquired from the reception signals by transmission into the base band and analog-to-digital conversion as well as the channel coefficients to a detector that equalizes the antenna data and undertakes the error correction. The symbols of the signals reconstructed in the output of the detector are subsequently decoded in a decoder, for example a Viterbi decoder.

It is known from mobile radiotelephone systems (see M. Mouly, M.-B. Pautet,"The GSM System for Mobile Communication", 49. rue Louise Bruneau, F-91120 Palaiseau, France, 1992, pp. 231–237) to utilize what are referred to as training sequences in order to equalize receiving radio stations. At predetermined points in time, the transmitting radio station transmits a sequence of digital data that are known to the receiving radio station, i.e. whose data are present undistorted in the receiving radio station.

SUMMARY OF THE INVENTION

It is an object of the present invention to provide a method for the parameterization of a reception means as well as such a reception means or, respectively, radio station in a radio system that enable an adjustable and improved immunity to disturbance.

In a radio system, a reception means with pre-filter is parameterized in that the filter coefficients of the pre-filter are adjustable, and a matching of the pre-filter to a given demand for immunity to disturbance ensues adaptively during the operation of the reception means together with the determination of channel coefficients. It is thus possible to do justice to modified reception conditions. Such a parameterization of the reception means proves advantageous precisely in radio systems since the conditions in the radio channel change fast. For example, training sequences known in radio systems are suitable for setting the filter coefficients.

According to an advantageous development of this inventive method, received reception signals are converted into digital signals in the reception means and are delayed by steps in the adaptive pre-filter belonging to the reception means; the differently delayed reception signals are respectively weighted with filter coefficients and superposed. The reception means also contains a channel model with which the radio channel between transmitting and receiving radio station can be simulated. The channel model is thereby characterized by channel coefficients with which the channel model is matched to the real radio channel. The channel model represents, for example, a filter with finite pulse response. The antenna data and the specific channel coefficients are supplied to a detector for equalization and error correction of the antenna data that is contained in the reception means.

During a training sequence, the signals represent received test data that are additionally present undisturbed in the reception means. Antenna data allocatable to the received test data and model quantities derived from the channel model supplied with the test data are supplied to an arithmetic unit. The filter coefficients for the suppression of received noise quantities and the channel coefficients for the equalization of the differences in running time of various signal components of a reception signal are now simultaneously determined in the arithmetic unit, which likewise belongs to the reception means. To that end, an algorithm is utilized that undertakes the minimization of the deviation of antenna data of the training sequence and model quantities of the training sequence. The determined filter coefficients and channel coefficients can subsequently also be used for the evaluation of the signals outside the training sequence. When processing digital reception signals, it is possible to realize pre-filter, channel model and arithmetic unit in a digital signal processor, additional circuit-oriented outlay being reduced as a result thereof.

The combination of adaptive pre-filter and channel model as well as the simultaneous calculation of the parameters for the filter coefficients and the channel coefficients in an arithmetic unit creates a significant improvement of the functioning of the reception means with respect to the reconstruction of transmitted information. The parameters required for setting the reception means can be determined in common with a simple algorithm. The secondary condition must thereby be noted that the trivial solution with filter coefficients and channel coefficients set to the value zero is precluded. A corresponding secondary condition is to be provided in the algorithm Dependent on the plurality of delay elements of the adaptive pre-filter, an improved noise signal suppression ensues both for noise sources in adjacent channels as well as in the proper channel, particularly sine-shaped noise sources. The number of sine noise sources that can be completely eliminated corresponds to the number of filter coefficients minus one. The adaptive pre-filter produces a clear improvement of the reception quality, as a result whereof, given employment of the radio station in a radio system, a gain in system capacity also derives, for example in mobile radiotelephone systems due to the greater density of mobile stations thereby enabled.

According to further developments of the subject matter of the invention, the algorithm for determining the filter coefficients and channel coefficients is fashioned such, upon exclusion of the trivial solution, that a plurality of sets of filter coefficients are present in the reception means with which the received test data are respectively evaluated and, subsequently, the channel coefficients are determined with a minimum deviation from antenna data and model quantities. The solution with the least deviation, i.e. the appertaining filter coefficients and specific channel coefficients thereto, is selected and serves for the parameterization of the reception means. This solution reduces the calculating outlay to the determination of the channel coefficients, whereas the filter coefficients are selected from a set of known filter coefficients.

An alternative version is comprised in utilizing the calculation of the least error square or a correlation calculation for the determination of the filter coefficients and of the channel coefficients without pre-selection, and, accepting greater calculating outlay, thus selecting the filter coefficients and channel coefficients from an infinitely great set of possible values, but again upon exclusion of the trivial solution. The trivial solution wherein filter coefficients and channel coefficients are set to zero corresponds to a possible but senseless solution. Consequently, it is necessary to fix one of the filter coefficients or of the channel coefficients to a value unequal to zero.

According to another advantageous development of the invention, a synchronization of the received test data with the test data processed in the channel model is undertaken before the ultimate determination of the filter coefficients and channel coefficients. Due to an unforeseeable running time of the reception signals of the training sequence between transmitter and receiver, the point in time of the arrival of the received test data in the reception means cannot be predicted with absolute certainty. A delay with which the reception signals are charged in the reception means is therefore calculated in order to assure the beginning of the training sequence and an effective calculation of the filter coefficients without the disturbing influence of an inadequate synchronization. For example, the delay can be determined in that a minimization of the deviation is undertaken at a number of positions of the data stream of the antenna data and the optimum solution—which corresponds to the synchronization—is selected. Subsequently, this delay is also used outside of the training sequence.

The remaining patent claims recite a radio station whose reception means is appropriately fashioned for the implementation of the parameterization. Advantageously, this radio station is utilized in radio systems that are operated in time-slot multiplex and the parameterization is redetermined for each individual time-slot. An example of a radio system operated in time-slot multiplex are [sic] mobile radiotelephone systems (GSM, GSM-like) or cordless communication systems (DECT), whereby the radio station is operated as base station or mobile station. The inventive reception means or, respectively, radio station and the inventive method particularly do justice to the specific conditions of a mobile radiotelephone system since changing propagation conditions derive due to the mobility of communication terminal equipment, whereupon the parameterization of the reception means can be correspondingly adapted.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
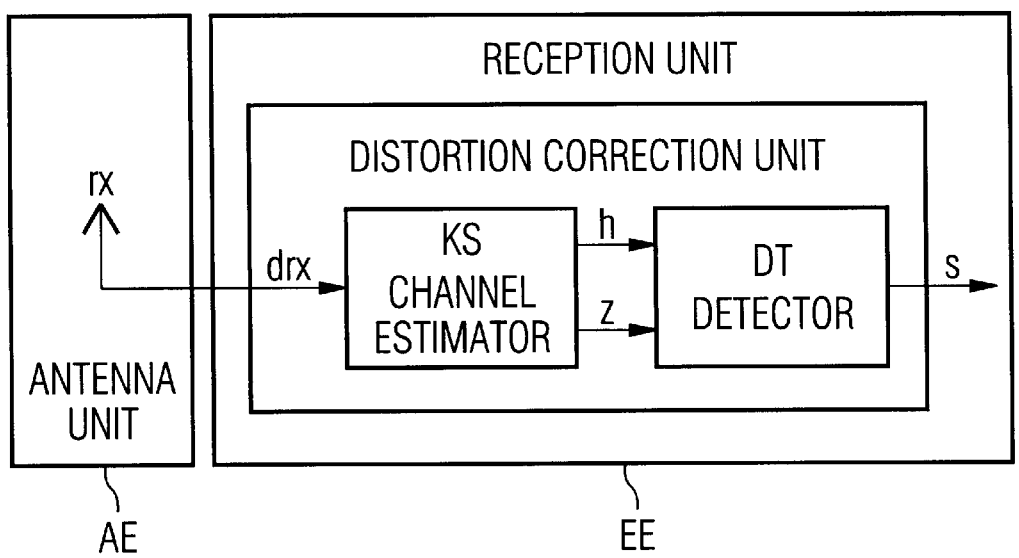
FIG. 1 is a block circuit diagram of a radio station.

FIG. 1 shows the reception means EE and the allocated antenna means AE of a radio station. This radio station is part of a radio system and receives reception signals rx from a transmitting radio station of this radio system. For example, the radio system is a GSM mobile radiotelephone system wherein the radio station shown in FIG. 1 represents a base station. Base stations are respectively connected via an air interface to mobile parts that, for example, represent the transmitting radio station. The reception case for the base station is present below; nonetheless, there is usually a two-way traffic relationship, i.e. the base station also comprises a transmission means. The reception means of the mobile part can also be fashioned according to the invention.

Digital signals drx are generated from the reception signals rx received in the antenna means AE, for example by a transmission into the base band and subsequent analog-to-digital conversion, and are supplied to an equalizer that is arranged within the reception means EE. It should be pointed out that the antenna data z and the coefficients c, h to be calculated hereinafter represent complex values when the base band conversion differs in in-phase and quadrature components.

The equalizer thereby contains a channel estimator KS and a detector DT. The digital signals drx serve as input signals for the channel estimator KS that is connected to the detector DT and supplies it with antenna data z derived from the digital signals drx and, further, with channel coefficients h determined in the channel estimator KS.

The detector DT undertakes an equalization and error correction of the antenna data z with the assistance of the channel coefficients h and generates symbols s that are supplied to further devices (not shown) of the reception means EE in which a decoding and, potentially, further processing steps are undertaken. The symbols s thereby represent the reconstructed signals rx processed by equalization and error correction.

Figure 2:
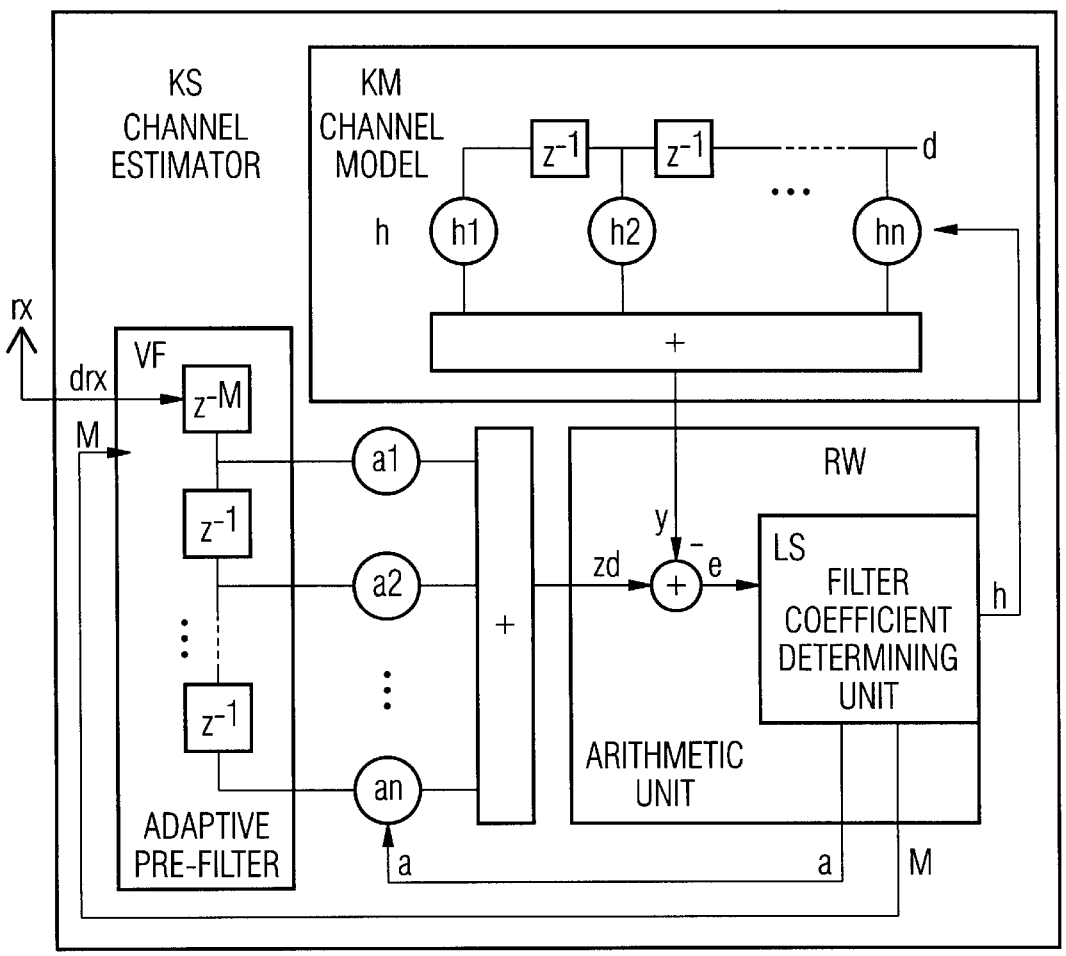
FIG. 2 is a block circuit diagram of a channel estimator during the parameterization.

The functioning of the channel estimator KS during the parameterization is explained in FIG. 2. The devices KM, RW contained in the channel estimator KS are advantageously implemented in a digital signal processor. In addition to the solution of the problem of the least error square, corresponding delays of data elements and a simulation according to the channel model KM can also ensue in the digital signal processor with corresponding algorithms.

The parameterization occurs during the reception of a training sequence. During this training sequence, the test data d are transmitted from a transmitting radio station to the receiving radio station shown in FIG. 1. Deteriorated due to multi-path propagation, disturbance and delay, the reception signals rx arrive at the receiving radio station and are available to the channel estimator KS as digital signals drx.

These digital signals drx are stored in a memory element and output delayed by a delay M. For example, the memory element is thereby part of an adaptive pre-filter VF. The pre-filter VF contains several (for example, 5 or 6) delay elements $z^{-1}$ in which the digital reception signals are delayed in steps. The digital signals drx are subsequently respectively weighted by filter coefficients a and then summed up, whereby the summing yields an antenna datum zd of the training sequence. Successive reception signals rx thus yield the antenna data zd of the training sequence.

The test data d known in the reception means EE are supplied to a channel model KM. This channel model KM is composed delay elements $z^{-1}$ that are arranged chain-like. The test data d pass through these delay elements $z^{-1}$. The undelayed test data d and the delayed test data d pending at the output of each and every delay element $z^{-1}$ are respectively weighted with a channel coefficient h and subsequently supped up to form a model quantity y. The multi-path propagation is simulated in this channel model KM, whereby successively arriving signal components are superposed to form a common signal. In mobile radiotelephone systems, 3 to 4 delay elements $z^{-1}$ suffice in order to compensate the multi-path propagation. The model quantities y are the output quantities of the channel model KM.

Further, the channel estimator KS contains an arithmetic unit RW that compares the antenna data zd of the training sequence and the model quantities and determines the deviation e of the two values. Within the arithmetic unit RW, the deviation e is supplied to a unit LS that determines the filter coefficients a, channel coefficients h and the delay M required for a minimum deviation e.

For paramterization, the delay M is determined first. The unit LS solves the problem of the least error square at several positions of the reception data stream that is formed by the antenna data zd of the training sequence. The position with the least quadratic error represents the synchronization position. The delay M is thus also defined that is used subsequently in the processing of the reception signals for the same time-slot, outside the training sequence as well. In the solution of the problem of the least error square, the secondary condition is also taken into consideration that not all filter coefficients a and channel coefficients h dare be zero. One of these values, for example, is therefore preset to a value unequal to zero.

As a result of this procedure, the synchronization and the determination of the filter coefficients a and channel coefficients h are simultaneously effected. In the solution of the problem of the least error square, the deviation e can advantageously be normalized by the sum of the squared channel coefficients h, as a result whereof the synchronization can be improved further. Instead of the solution of the least error square, however, other suitable algorithms that produce a minimization of the deviation e can also be employed. The channel coefficients h, filter coefficients a and the delay M determined by the arithmetic unit RW are also subsequently employed outside the training sequence for improving the reception of the reception means EE.

Figure 3:
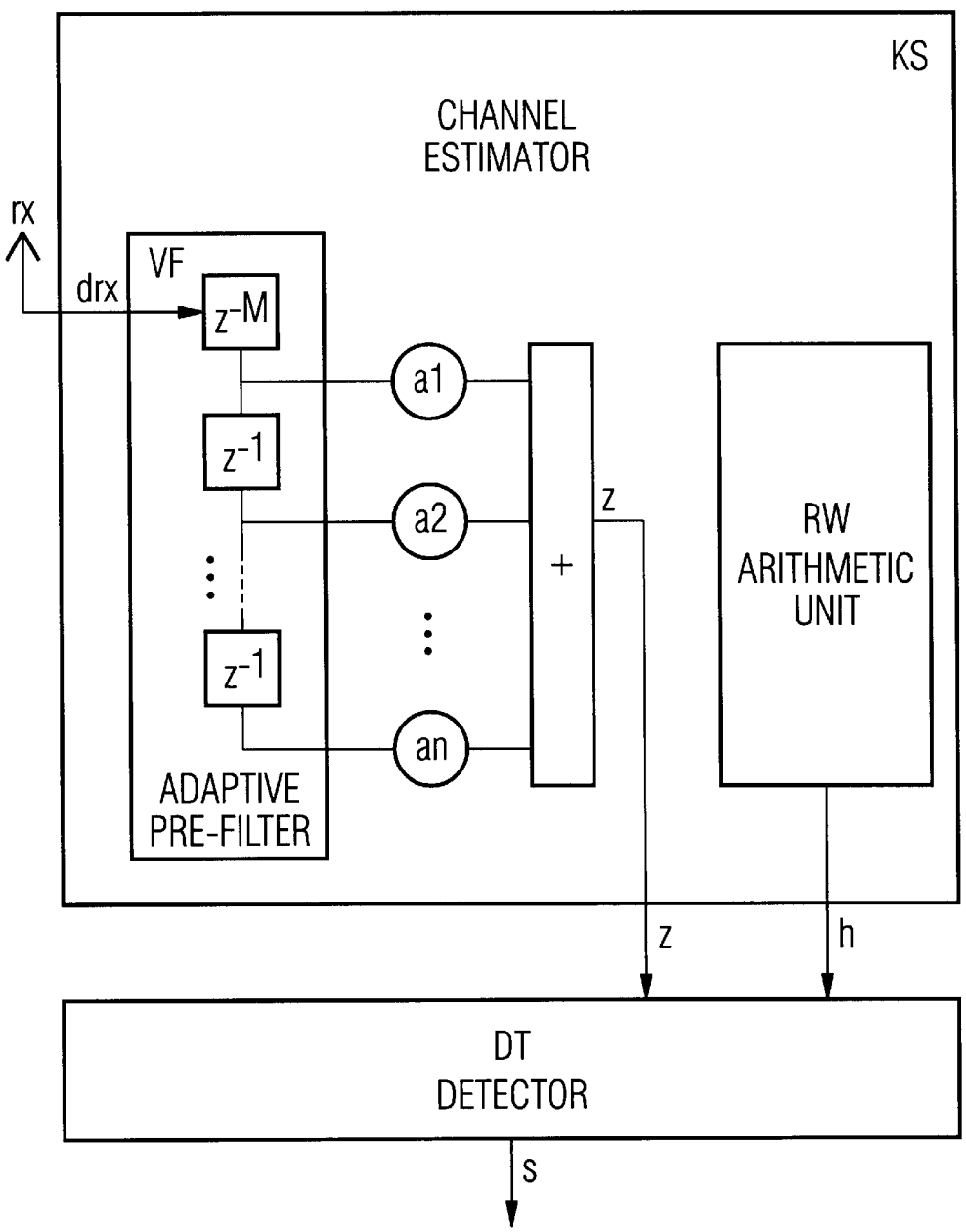
FIG. 3 is a block circuit diagram of the reception means during reception with previously determined parameters outside the training sequence.

FIG. 3 shows the reception and the further-processing of the reception signals rx outside the training sequence. The channel estimator KS accepts the digital signals drx and delays them according to the previously determined delay M before they are delayed in the adaptive pre-filter VF and superposed to form antenna data z, weighted by the identified filter coefficients a. The channel estimator KS supplies these antenna data z to the detector DT. Further, the identified channel coefficients h are also communicated to the detector DT by the channel estimator KS.

This detector DT can subsequently undertake the equalization and error correction of the antenna data z and generates the symbols s. The inventive reception means EE thereby exhibits an improved suppression of noise signals that is achieved by the combination of pre-filtering and taking running time differences of signal components into consideration in a single algorithm. The complexity of the adaptive pre-filter, i.e., for example, the plurality of delay elements $z^{-1}$, plays a part in the effectiveness of the inventive radio station or, respectively, of the inventive method.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be inter- pretend as illustrative and not in a limiting sense.

What is claimed is:

1. A method for parameterization of a reception apparatus in a radio system, comprising the steps of:
   receiving reception signals with an allocated antenna device;
   digitizing the received signals;
   supplying the digitized signals to an adaptive pre-filter to create filter signals, and supplying the filter signals to an arithmetic unit, the arithmetic unit simultaneously setting filter coefficients of the pre-filter and channel coefficients of a channel model during receiving of the reception signals; and
   equalizing and error-correcting the filter signals.

2. A method for parameterization of a reception apparatus in a radio system, comprising the steps of:
   receiving reception signals with an allocated antenna device;
   digitizing the received signals;
   supplying the digitized signals to an adaptive pre-filter to create filter signals, and supplying the filter signals to an arithmetic unit, the arithmetic unit simultaneously setting filter coefficients of the pre-filter and channel coefficients of a channel model during receiving of the reception signals;
   equalizing and error-correcting the filter signals;
   digital signals derived in the adaptive pre-filter from the reception signals are delayed, differently delayed digital signals being respectively weighted with a filter coefficient and superposed to form antenna data;
   the antenna data as well as the channel coefficients determined in the channel model and provided for taking into consideration multi-path propagation of the reception signals are supplied to a detector for equalization and error-correction of the antenna data;
   wherein, during a training sequence with test data model quantities and antenna data allocatable to the received test data are supplied to an arithmetic unit, the model quantities being derived from the channel model supplied with undistorted test data present in the reception apparatus; and in the arithmetic unit, the filter coefficients for suppression of received noise quantities and the channel coefficients for the compensation of the transit time differences of various signal components of a reception signal are simultaneously determined with an algorithm that is provided for the minimization of the deviation of antenna data of the training sequences and model quantities of the training sequence, and wherein these identified filter coefficients and channel coefficients are provided for evaluation of the reception signals outside the training sequence.

3. The method according to claim 2, wherein the algorithm for the determination of the filter coefficients and of the channel coefficients is structured such that, upon exclusion of a trivial solution, the received test data is evaluated with a plurality of predetermined sets of filter coefficients, the channel coefficients being determined with a minimum deviation of antenna data and model quantities, and set of filter coefficients at which a deviation of antenna data and model quantities is lowest and an appertaining, identified channel coefficients are selected.

4. The method according to claim 2, wherein the algorithm for determining the filter coefficients and the channel coefficients is structured such that, upon exclusion of a trivial solution minimization of the deviation of antenna data and model quantities is undertaken by calculation of a least error square.

5. The method according to claim 2, before determination of the filter coefficients and of the channel coefficients, a synchronization of received test data with test data processed in the channel model is undertaken by determining a delay, and the delay for the evaluation of the reception signals is also provided outside the training sequence.

6. A reception device in a radio system, comprising:

an allocated antenna device for reception of reception signals;

a pre-filter for delaying digital signals derived from the reception signals for evaluating differently delayed digital signals with a respective filter coefficient and for superposition thereof to form antenna data;

a detector for equalization and for error-correction of the antenna data by an evaluation of the antenna data and channel coefficients determined in a channel model provided for taking multi-path propagation of the reception signals into consideration; and an adaptive device for simultaneously setting the filter coefficients of the pre-filter and the channel coefficients of the channel model.

7. A reception device in a radio system, comprising:

an allocated antenna device for reception of reception signals;

a pre-filter for delaying digital signals derived from the reception signals, for evaluating differently delayed digital signals with a respective filter coefficient and for superposition thereof to form antenna data;

a detector for equalization and for error-correction of the antenna data by an evaluation of the antenna and channel coefficients determined in a channel model provided for taking multi-path propagation of the reception signals into consideration;

an adaptive device for simultaneously setting the filter coefficients of the pre-filter and the channel coefficients of the channel model; and the reception device further comprising an arithmetic unit for determining the filter coefficients for suppressing received noise quantities and the channel coefficients for compensation of transit time differences of various signal components of a reception signal, upon employment of an algorithm for minimizing deviation of antenna data of a training sequence and model quantities of test data present in the reception device during a training sequence.

8. The reception device according to claim 7, wherein the reception device also provides evaluation of the reception signals with the identified filter coefficients and channel coefficients outside the training sequence.

9. The reception device according to claim 7 wherein during the training sequence, the adaptive pre-filter provides the evaluation of the signals with a plurality of predetermined sets of filter coefficients, and the arithmetic unit provides determination of the channel coefficients such that that set of filter coefficients at which a deviation of antenna data and model quantities is lowest and appertaining, identified channel coefficients are selected, upon exclusion of a trivial solution.

10. The reception device according to claim 7, wherein, during the training sequence, the arithmetic unit provides determination of the filter coefficients and of the channel coefficients with a minimum deviation of antenna data and model quantities according to a method of least error square, upon exclusion of a trivial solution.

11. The reception device according to claim 7, wherein the arithmetic unit provides determination of a delay for synchronization of received test data with test data processed in the channel model independently of or dependent on a determination of the channel coefficients and filter coefficients, and wherein the adaptive pre-filter also provides a delay in the evaluation of the signals for synchronization outside a training sequence.

12. A reception device in a radio system, comprising:

an allocated antenna device for reception of reception signals;

a pre-filter for delaying digital signals derived from the reception signals and for evaluating differently delayed digital signals with a respective filter coefficient and for superposition thereof to form antenna data;

a detector for equalization and for error-correction of the antenna data by an evaluation of the antenna data and channel coefficients determined in a channel model and provided for taking multi-path propagation of the reception signals into consideration;

adaptive device for simultaneously setting the filter coefficients of the pre-filter and the channel coefficients of the channel model;

an arithmetic unit for determining the filter coefficients for suppressing received noise quantities and the channel coefficients for compensation of transit time differences of various signal components of a reception signal, upon employment of an algorithm for minimizing deviation of antenna data of a training sequence and model quantities of test data present in the reception means during a training sequence;

the arithmetic unit providing determination of a delay for synchronization of received test data with test data processed in the channel model independently of or dependent on a determination of the channel coefficients and filter coefficients, and the adaptive pre-filter also providing a delay in the evaluation of the signals for synchronization outside a training sequence;

the synchronization being effected in that a determination of the channel coefficients and the filter coefficients is undertaken at a plurality of positions of the antenna data, and a solution with a least deviation being selected.

13. The reception device according to claim 6, wherein the reception device is utilized in a radio station.

14. The reception device according to claim 13 wherein the radio station is operated in a time-slot multiplex mode and provides determination of parameters for a respective time-slot.

15. The reception device according to claim 14, wherein the radio station is a base station of a mobile radiotelephone system.

16. The reception device according to claim 14, wherein the radio station is a mobile station of a mobile radiotelephone system.

* * * * *